T. S. WHITE.
ADJUSTABLE CRANK.
APPLICATION FILED OCT. 10, 1908.
963,016.
Patented June 28, 1910.
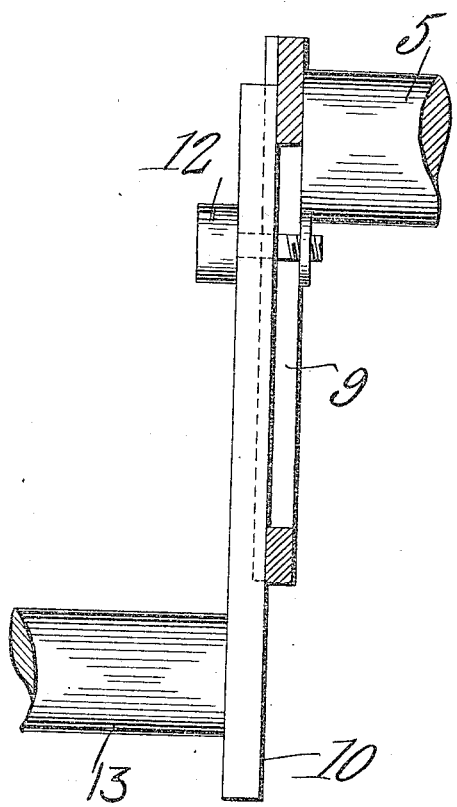
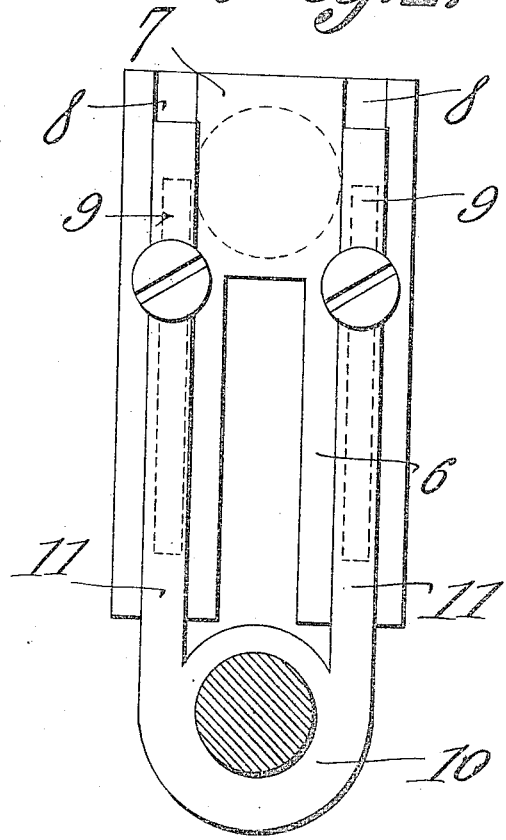
Witnesses
Inventor
Thomas S. White.
By
Attorneys

UNITED STATES PATENT OFFICE.

THOMAS S. WHITE, OF WEST FRANKFORT, ILLINOIS.

ADJUSTABLE CRANK.

963,016.

Specification of Letters Patent. Patented June 28, 1910.

Application filed October 10, 1908. Serial No. 457,165.

*To all whom it may concern:*

Be it known that I, THOMAS S. WHITE, a citizen of the United States, residing at West Frankfort, in the county of Franklin and State of Illinois, have invented a new and useful Adjustable Crank, of which the following is a specification.

It is the object of the present invention to provide an improved crank designed primarily for use in connection with sewing machine motors and the aim of the invention is to so construct the crank that it may be adjusted as regards length so that the motor in connection with which it is used, may be applied to various makes of machines without necessitating the manufacture of a separate crank to suit each use.

It is also an aim of the invention, incidentally, to provide for adjustment of the crank as regards length, without weakening the same.

In the accompanying drawings,—Figure 1 is a view partly in side elevation and partly in section of a crank constructed in accordance with the present invention. Fig. 2 is a view partly in front elevation and partly in section of the said crank.

In the drawings, there is illustrated a portion of a driving shaft which is indicated by the numeral 5 and secured to or formed upon this shaft at its end is a crank section comprising spaced arms 6 and a connecting body portion 7. It will be observed from an inspection of Fig. 2 of the drawings that the arms 6 are two in number and lie to opposite sides of the shaft 5.

In their forward faces, the arms 6 are formed each with a groove 8 and each arm is further formed, in the bottom wall of its groove 8, with a slot 9 which extends nearly the entire length of the said groove. Assembled with the said crank section carried by the shaft 5, is a second crank section which carries the crank pin and this said second crank section has a nearly circular body 10 from which project parallel arms 11 of substantially the same width as the grooves 8 and spaced apart a distance corresponding to the distance between the said grooves 8. In assembling the two sections, the arms 11 are fitted in the grooves 8 in the section 7 and set screws 12 are engaged through openings in the said arms 11 and through the respective slots 9. It will be readily understood from the foregoing that by loosening the two set screws 12, the sections of the crank may be relatively adjusted, and for this reason the crank is particularly well adapted for use in connection with sewing machine motors where it is necessary to apply such motors to many different makes of machines.

As a matter of convenience, the crank pin indicated by the numeral 13, is broken away in Fig. 1 of the drawings and may either be the pin of a double crank or the pin of a single crank, the construction of the crank sections, in either case, remaining the same, as here illustrated, except as regards the number employed.

Having thus described the invention what is claimed is:

1. A crank shaft comprising a shaft section, a yoke carried by the section and having spaced parallel arms formed each with a groove and with a slot opening into the groove, a crank pin, and a yoke carried at the end of the crank pin and having spaced parallel arms seating in the grooves in the arms of the yoke upon the shaft section, and securing elements passed through the arms and the slots.

2. A crank-shaft comprising a shaft section, a yoke comprising spaced parallel arms, and a connecting portion, which connecting portion is secured to the shaft section, the arms being formed each with a longitudinally extending groove and a slot opening into the groove, a yoke having spaced parallel arms and a connecting portion, the arms of the last mentioned yoke having ribs received in the groove in the first mentioned yoke, the said arms of the last mentioned yoke having portions projecting beyond that face of the arms of the first mentioned yoke through which the groove is formed, and securing elements passed through the arms of the last mentioned yoke, and through the slots in the arms of the first mentioned yoke, said securing elements being correspondingly located upon the two arms, and a crank-pin carried by the connecting portion of the last mentioned yoke.

3. A crank shaft comprising a shaft section, a yoke comprising spaced parallel arms and a connecting portion, which connecting portion is secured to the shaft section, the arms being formed each with a longitudinally extending groove and a slot opening into the groove, a yoke having spaced parallel arms and a connecting portion, the arms of the last mentioned yoke being received in the grooves in the first mentioned yoke, securing elements passed through the arms of the last mentioned yoke and through the slots in the arms of the first mentioned yoke, and a crank pin carried by the connecting portion of the last mentioned yoke.

In testimony that I claim the foregoing as my own, I have hereto affixed my signature in the presence of two witnesses.

THOMAS S. WHITE.

Witnesses:
W. D. BLAKE,
F. A. BAXTER.